United States Patent
Ju et al.

(10) Patent No.: US 11,435,710 B2
(45) Date of Patent: Sep. 6, 2022

(54) HOME APPLIANCE CONTROL SYSTEM AND HOME APPLIANCE

(71) Applicant: BSH HAUSGERAETE GMBH, Munich (DE)

(72) Inventors: Wangkou Ju, Nanjing (CN); Chao Li, Nanjing (CN); Hui Yang, Nanjing (CN)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 17/258,251

(22) PCT Filed: Jul. 30, 2019

(86) PCT No.: PCT/IB2019/056465
§ 371 (c)(1),
(2) Date: Jan. 6, 2021

(87) PCT Pub. No.: WO2020/044142
PCT Pub. Date: Mar. 5, 2020

(65) Prior Publication Data
US 2021/0271215 A1 Sep. 2, 2021

(30) Foreign Application Priority Data
Aug. 27, 2018 (CN) .......................... 201810986827.2

(51) Int. Cl.
*G05B 15/02* (2006.01)
*G06F 16/28* (2019.01)
(Continued)

(52) U.S. Cl.
CPC .......... *G05B 15/02* (2013.01); *G06F 16/284* (2019.01); *H04L 12/2816* (2013.01); *H04L 67/10* (2013.01)

(58) Field of Classification Search
CPC .................. G05B 15/02; G05B 19/418; G05B 2219/2642; G06F 16/284; H04L 12/2816;
(Continued)

(56) References Cited

U.S. PATENT DOCUMENTS

| 2015/0134727 A1* | 5/2015 | Lee ........................ H04L 67/025 709/203 |
| 2016/0234186 A1* | 8/2016 | Leblond .................. H04L 63/08 |
| 2017/0272824 A1* | 9/2017 | Bunner ................ H04N 21/482 |

FOREIGN PATENT DOCUMENTS

| WO | 2013015655 A2 | 1/2013 |
| WO | 2015000198 A1 | 1/2015 |

\* cited by examiner

*Primary Examiner* — Charles R Kasenge
(74) *Attorney, Agent, or Firm* — Laurence A. Greenberg; Werner H. Stemer; Ralph E. Locher

(57) ABSTRACT

A home appliance control system includes a home appliance having at least one functional module and a cloud server, communicating with the home appliance. The cloud server is adapted to send a control instruction identifiable by the functional module. The home appliance further includes a communication module, the communication module being adapted to receive the control instruction from the cloud server. The home appliance further includes a drive module, the drive module being adapted to acquire the control instruction from the communication module and drive the at least one functional module according to the control instruction. The system can control all the control functions of the home appliance through the cloud, so as to reduce the hardware equipment of the home appliance control unit, reduce the cost, and optimize the use effect.

8 Claims, 2 Drawing Sheets

(51) Int. Cl.
*H04L 29/08* (2006.01)
*H04L 12/28* (2006.01)
*H04L 67/10* (2022.01)

(58) Field of Classification Search
CPC ............... H04L 67/10; H04L 2012/285; H04L 12/2818
See application file for complete search history.

HOME APPLIANCE CONTROL SYSTEM AND HOME APPLIANCE

BACKGROUND

The present invention relates to the field of smart home appliances, and in particular to a home appliance control system and a home appliance.

With the development of Internet technology, cloud technology and big data technology are becoming more and more mature. Many control functions that must be implemented in a terminal can now be realized through the cloud.

In order to better facilitate user use, smart home appliances have gradually become a major development trend today.

However, the existing intelligent control schemes for home appliances generally have problems of repeated control functions and poor user experience.

SUMMARY OF THE INVENTION

It is an object of the present invention to provide an improved home appliance control system and an improved home appliance. This problem is solved by the subject-matter of the independent claims. Embodiments are described by the dependent claims as well as the following description and the drawings.

Therefore, the embodiments of the present invention provide a home appliance control system, including: a home appliance, the home appliance including at least one functional module; and a cloud server, communicating with the home appliance, the cloud server being adapted to send a control instruction identifiable by the functional module; wherein the home appliance further includes a communication module, the communication module being adapted to receive the control instruction from the cloud server; and the home appliance further includes a drive module, the drive module being adapted to acquire the control instruction from the communication module and drive the at least one functional module according to the control instruction.

Compared with the prior art, an advantage of the embodiments of the present invention is that the control instruction sent by the cloud server is directly identifiable by the functional module of the home appliance such that it is possible to remove hardware equipment related to the control module in the home appliance. On the one hand, the manufacturing cost of the home appliance can be reduced, and on the other hand, all the control functions of the home appliance can be controlled through the cloud, making the cloud become the control center of all the home appliances. Further, by removing the control module of the home appliance from the home appliance, and virtualizing and integrating it into the cloud, the repeated control function can be effectively avoided, and the control advantage of the smart home appliance can be fully utilized to optimize the user experience.

Optionally, after receiving and responding to a control request of a user terminal device, the cloud server generates the control instruction according to the control request. Thus, the control request can be sent by the user through the user terminal device to control/adjust the operating state of the home appliance through the cloud server.

Optionally, the control request includes an operation mode of the home appliance, and the cloud server generates the control instruction according to the control request as follows: the cloud server searches an operation parameter matching with the operation mode included in the control request in a preset database, and generates the control instruction based on the operation parameter, the preset database recording a corresponding relationship between the operation mode of the home appliance and the operation parameter. Thus, the control request of the user is converted into a corresponding control instruction identifiable by the functional module through the preset database, so that the functional module of the home appliance can directly adjust its operating state according to the operation parameters included in the control instruction.

Optionally, the user terminal device is provided with an access port, the access port is connected to the cloud server, a user sends the control request to the cloud server through the access port, the home appliance is provided with an access port link, and the user terminal device is connected to the access port through the access port link. Thus, communication between the user terminal device and the cloud server can be realized, and the control request of the user can be successfully sent to the cloud server.

Optionally, the access port link is a graphic code. Thus, user operations are facilitated, for example, the user can link to the access port by scanning the graphic code using the user terminal device.

Optionally, the home appliance further includes: a hard boot module, the hard boot module being coupled to the communication module and the drive module, and after receiving and responding to an input signal, the hard boot module generating a hard boot signal, and sending the hard boot signal to the cloud server through the communication module. Thus, in addition to the user terminal device, the cloud server may be triggered by using a hard boot module set on the home appliance to generate the control instruction, so as to provide diversified operation modes for the user and optimize the user experience.

Optionally, after receiving and responding to the hard boot signal and failing to receive the control request of the user terminal device within a preset time period, the cloud server generates the control instruction. Thus, in response to the hard boot module being triggered while no further instructions from the user are received within a preset time period, a control instruction can be actively generated to control the operation of the home appliance.

Optionally, the control instruction is generated according to historical control data for the home appliance, the control data including operation parameters of at least one functional module. Thus, it is possible to more intelligently determine an appropriate control instruction by big data analysis to control the home appliance to operate to an appropriate operating state.

Optionally, the home appliance comprises only one button, which preferably is adapted to turn the home appliance on and off. When the home appliance is turned on, the hard boot module may be triggered. Thus, in this embodiment, while controlling the power-on of the home appliance, the cloud server is prompted that the home appliance has been turned on, so that the cloud server can receive the control request of the user terminal device in time or directly generate a control instruction after a preset time period.

Optionally, the communication module is integrated with the drive module to save the space occupied by the home appliance, which is advantageous for realizing miniaturization design of the home appliance.

Optionally, the communication module is a wireless communication module, and communicates with the cloud server by means of wireless signals, so that the setting position of the home appliance and/or the cloud server is more flexible.

The embodiments of the present invention further provide a home appliance including at least one functional module, further including: a communication module, the communication module being adapted to receive a control instruction from a cloud server, and the control instruction being identifiable by the functional module; and a drive module, the drive module being adapted to acquire the control instruction from the communication module and drive the at least one functional module according to the control instruction.

Compared with the existing home appliances, an advantage of the embodiments of the present invention is that the hardware equipment related to the control unit of the home appliance can be completely deleted, so that the manufacturing cost of the home appliance is significantly reduced, and the repeated control function is effectively avoided. Further, the home appliance performs daily operation in response to the control instruction of the cloud server, and can truly realize the design concept of the smart home appliance.

Optionally, the communication module is integrated with the drive module to save the space occupied by the home appliance, which is advantageous for realizing miniaturization design of the home appliance.

Optionally, the communication module is a wireless communication module, and communicates with the cloud server by means of wireless signals, so that the setting position of the home appliance and/or the cloud server is more flexible.

Optionally, the home appliance further includes: a hard boot module, the hard boot module being coupled to the communication module and the drive module, and after receiving and responding to an input signal, the hard boot module generating a hard boot signal, and sending the hard boot signal to the cloud server through the communication module, the hard boot signal being adapted to instruct the cloud server to generate the control instruction. Thus, on the basis of removing the control module of the home appliance, the hard boot module is reserved on the home appliance, so that the user can trigger the cloud server by using the hard boot module to generate the control instruction, so as to provide diversified operation modes for the user and optimize the user experience.

Optionally, the home appliance has only one button, wherein the button may be coupled to the hard boot module. Thus, while controlling the power-on of the home appliance, the cloud server is prompted that the home appliance has been turned on, so that the cloud server can generate a control instruction in time after a preset time period.

The invention has been described with regard to a home appliance control system and a home appliance. If not stated otherwise, features which were disclosed with regard to one claim category may be applied to all other claim categories and vice versa.

100—home appliance control system; 110—home appliance; 111—communication module; 112—drive module; 113—access port link; 114—hard boot module; 120—cloud server; 130—user terminal device; 131—access port.

DETAILED DESCRIPTION OF THE INVENTION

As the related art says, the existing intelligent control scheme for home appliances generally has the problems of repeated control functions and poor user experience. The inventors of the present application have found through analysis that one of the causes of the above problems is that: the control functions of existing home appliances are generally realized on home appliance terminals. Even though the cloud control function is provided, the hardware and software of the main control system of the home appliance are integrated into the home appliance, which leads to repeated control functions, and the advantages of the convenience of smart home appliance control modes such as the cloud cannot be fully utilized.

To solve the above technical problems, the solution of the embodiments of the present invention provides a home appliance control system, including: a home appliance, the home appliance including at least one functional module; and a cloud server, communicating with the home appliance, the cloud server being adapted to send a control instruction identifiable by the functional module; the home appliance further includes a communication module, the communication module being adapted to receive the control instruction from the cloud server; and the home appliance further includes a drive module, the drive module being adapted to acquire the control instruction from the communication module and drive the at least one functional module according to the control instruction.

Those skilled in the art understands that an advantage of the embodiments of the present invention is that the control instruction sent by the cloud server is directly identifiable by the functional module of the home appliance such that it is possible to remove hardware equipment related to the control module in the home appliance. On the one hand, the manufacturing cost of the home appliance can be reduced, and on the other hand, all the control functions of the home appliance can be controlled through the cloud, making the cloud become the control center of all the home appliances.

Further, by removing the control module of the home appliance from the home appliance, and virtualizing and integrating it into the cloud, the repeated control function can be effectively avoided, and the control advantage of the smart home appliance can be fully utilized to optimize the user experience.

Figure 1:
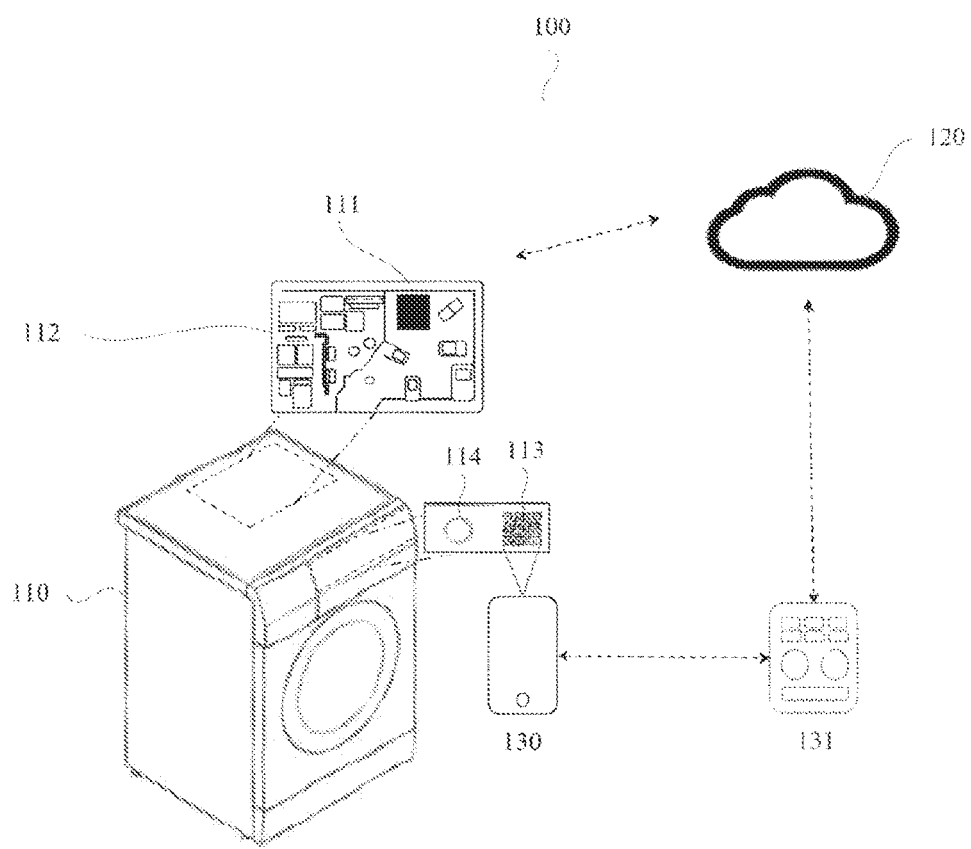
FIG. 1 is a schematic diagram of a home appliance control system according to embodiments of the present invention.

In order to make the aforementioned objectives, features and advantages of the present invention more apparent and comprehensible, specific embodiments of the present invention will be described in detail below with reference to the accompanying drawings. FIG. 1 is a schematic diagram of a home appliance control system according to embodiments of the present invention.

The solution of this embodiment can be applied to a control scenario of a smart home appliance having a communication function, such as a washing machine, a refrigerator, an air conditioner, a microwave oven, or a television.

Specifically, referring to FIG. 1, the home appliance control system 100 may include: a home appliance 110, the home appliance 110 including at least one functional module (not shown); and a cloud server 120, communicating with the home appliance 110, the cloud server 120 being adapted to send a control instruction identifiable by the functional module. The home appliance 110 further includes a communication module 111, the communication module 111 being adapted to receive the control instruction from the cloud server 120. The home appliance 110 may further include a drive module 112, the drive module 112 being adapted to acquire the control instruction from the communication module 111 and drive the at least one functional module according to the control instruction.

FIG. 1 shows an example in which the home appliance 110 is a washing machine.

In one or more embodiments, the functional module (also referred to as an operation module) may be used to control the home appliance 110 to operate in a corresponding operating state.

Taking the washing machine as an example, the functional module may include: a motor, a drainage pump, a water level switch, an inlet valve, and the like.

In one or more embodiments, the control instruction may be a control command code identifiable by the functional module, and after receiving and responding to the control command code, the drive module 112 sends a corresponding control signal to a corresponding functional module, so that the functional module executes a corresponding working program.

Taking the washing machine as an example, the control instruction may include a drum rotation speed, a laundry time length and a water level, and the drive module 112 may separately send the above three parameters to the corresponding functional modules in the form of corresponding control signals, so that the washing machine can operate in an operating state indicated by the control instruction.

In one or more embodiments, the drive module 112 may be a power unit (PU) for powering and driving various functional modules of the home appliance 110. Further, after receiving and responding to the control instruction, the drive module 112 may supply power to a functional module pointed by the control instruction, and send the operation parameters included in the control instruction to the functional module, so that the functional module can operate according to the operation parameters.

In one or more embodiments, with continued reference to FIG. 1, the communication module 111 may be integrated with the drive module 112 to save the space occupied by the home appliance 110, which is advantageous for realizing miniaturization design of the home appliance 110.

For example, the communication module 111 may be integrated in a reserved region on an integrated circuit board of the drive module 112.

In one or more alternatives, the communication module 111 may also be integrated with different regions of the home appliance 110 independently of the drive module 112 and coupled to the drive module 112 to transmit the received control instruction to the drive module 112.

In one or more embodiments, the communication module 111 may be a wireless communication module to communicate with the cloud server 120 by means of wireless signals, so that the setting position of the home appliance 110 and/or the cloud server 120 is more flexible.

For example, the communication module 111 may be a Wireless-Fidelity (WiFi) module. For another example, the communication module 111 may be a Near Field Communication (NFC) module.

Thus, the cloud server 120 may be arranged anywhere. For example, the home appliance 110 integrated with the communication module 111 may be placed in a user's home, and the cloud server 120 may be disposed anywhere else, such as a community in which the user is located, or even a computer room of the home appliance 110 manufacturer.

In one or more alternatives, the communication module 111 and the cloud server 120 may also communicate with each other in a wired form.

In one or more embodiments, after receiving and responding to a control request of a user terminal device 130, the cloud server 120 may generate the control instruction according to the control request. Thus, the control request can be sent by the user through the user terminal device 130 to control/adjust the operating state of the home appliance 110 through the cloud server 120.

For example, the user terminal device 130 may be a smart terminal such as a mobile phone, a tablet computer, or an IPAD.

Further, the user terminal device 130 may communicate with the cloud server 120 to check the operating state of the home appliance 110 through the cloud server 120, and send a control request to the cloud server 120 to control/adjust the operating state of the home appliance 110 through the cloud server 120.

In one or more embodiments, the control request may include operation parameters of one or more functional modules of the home appliance 110.

In a typical application scenario, the user may send a control request to the cloud server 120 through the user terminal device 130, where the control request includes the working time length of the home appliance 110 (such as, half an hour). In response to that the control request is received, the cloud server 120 generates a corresponding control command code and sends it to the drive module 112 through the communication module 111. In response to that the control instruction including the control command code is received, the drive module 112 controls the corresponding functional module to stop working after half an hour.

In one or more alternatives, the control request may include an operation mode of the home appliance 110. Correspondingly, the cloud server 120 may search an operation parameter matching with the operation mode included in the control request in a preset database, and generate the control instruction based on the operation parameter. The preset database records a corresponding relationship between the operation mode of the home appliance 110 and the operation parameter.

Thus, the control request of the user is converted into a corresponding control instruction identifiable by the functional module through the preset database, so that the functional module of the home appliance 110 can directly adjust its operating state according to the operation parameters included in the control instruction.

In a typical application scenario, still taking the washing machine as an example, the user may browse and select a desired washing machine operation mode (such as a soft washing mode) on the user terminal device 130 (such as a mobile phone), the mobile phone may send the soft washing mode selected by the user to the cloud server 120, and the cloud server 120 searches for a preset database associated with the washing machine and determines operation parameters of the respective functional modules corresponding to the soft washing mode, generates the control instruction based on the operation parameters, and sends the control instruction to the communication module 111. The communication module 111 receives the control instruction and transmits the control instruction to the drive module 112, and the drive module 112 may drive the corresponding functional module according to the operation parameters included in the control instruction, so that the washing machine operates in the soft washing mode.

In one or more embodiments, the user terminal device 130 may be provided with an access port 131, the access port 131 may be connected to the cloud server 120, a user sends the control request to the cloud server 120 through the access port 131, the home appliance 110 is provided with an access port link 113, and the user terminal device 130 is connected to the access port 131 through the access port link 113. Thus, communication between the user terminal device 130 and the cloud server 120 can be realized, and the control request of the user can be successfully sent to the cloud server 120.

For example, the access port 131 may be an application (APP) installed on the user terminal device 130. Correspondingly, the cloud server 120 may be a background server of the APP.

Further, at least one operation mode of the home appliance 110 may be integrated in the APP, and operation parameters of at least one functional module of the home appliance 110 may also be integrated therein. The user selects/adjusts the operation parameters of the operation module and/or the one or more functional modules in the APP, and control on the operating state of the home appliance 110 can be achieved by cooperation of the APP, the cloud server 130, the communication module 111 and the drive module 112.

In one or more embodiments, the access port link 113 may be a graphic code. Thus, user operations can be facilitated, for example, the user can link to the access port 131 by scanning, using the user terminal device 130, the graphic code.

For example, the graphic code may be a two-dimensional code, and the APP may be downloaded from the user terminal device 130 by scanning the two-dimensional code to set the access port 131 on the user terminal device 130.

In one or more embodiments, the access port link 113 may be set (such as, pasted) on the surface of the home appliance 110.

In one or more alternatives, the access port link 113 may also be set (such as, printed) on a place not directly reflected on the home appliance 110, such as the instruction manual of the home appliance 110.

In one or more embodiments, the home appliance 110 may further include: a hard boot module 114. The hard boot module 114 may be coupled to the communication module 111 and the drive module 112. After receiving and responding to an input signal, the hard boot module 114 may generate a hard boot signal, and sends the hard boot signal to the cloud server 120 through the communication module 111. Thus, in addition to the user terminal device 130, the cloud server 120 may be triggered by using a hard boot module 114 set on the home appliance 110 to generate the control instruction, so as to provide diversified operation modes for the user and optimize the user experience. Specifically, the input signal may be generated by a hard trigger.

For example, the home appliance may comprise only one button, which is coupled with the hard boot module 114. After the user has pressed this button, the input signal can be triggered to enable the hard boot module 114 to generate the hard boot signal. Thus, while controlling the power-on of the home appliance 110, the cloud server 120 is prompted that the home appliance 110 has been turned on, so that the cloud server 120 can receive the control request of the user terminal device 130 in time or directly generate a control instruction after a preset time period.

Further, the hard boot signal may be used to indicate that the home appliance 110 is powered on and in a standby state.

After receiving and responding to the hard boot signal, the cloud server 120 can wait for a control request of the user terminal device 130 to determine the operation parameters that the control instruction needs to include.

In one or more embodiments, after receiving and responding to the hard boot signal and failing to receive the control request of the user terminal device 130 within a preset time period, the cloud server 120 may generate the control instruction. Thus, in response to the hard boot module 114 being triggered while no further instructions are received from the user within a preset time period, a control instruction can be actively generated by the cloud server 120 to control the operation of the home appliance 110.

Preferably, the preset time period may be used for a user to send a control request to the cloud server 120 through the user terminal device 130.

For example, the preset time period may be 15 minutes. The preset time period may also be specifically adjusted as needed by those skilled in the art, and details are not described herein.

In one or more embodiments, the control instruction actively generated by the cloud server 120 may be generated according to historical control data of the home appliance 110, and the control data may include operation parameters of at least one functional module. Thus, it is possible to more intelligently determine an appropriate control instruction by big data analysis to control the home appliance 110 to operate to an appropriate operating state.

For example, the current control instruction may be determined according to the operation parameters of the last time the home appliance 110 is historically operated.

For another example, the current operating environment (such as weather, etc.) in which the home appliance 110 is currently located and the operating parameters historically in a similar operating environment may be obtained according to the location of the home appliance 110 to determine the current control instruction.

For still another example, when the home appliance 110 is a washing machine, the operation parameters included in the control instruction may also be adjusted according to the hardness of the washing machine water.

In a typical application scenario, with continued reference to FIG. 1, still taking a washing machine as an example, based on the solution of this embodiment, in terms of software, all programs in a control panel chip of the washing machine are integrated into the cloud server 120 to realize various functional control of the washing machine through the cloud server 120.

In terms of hardware, hardware equipment related to the entire control panel on the washing machine can be removed, and the washing machine may be provided with the drive module 112, the communication module 111 and the hard boot module 114.

In this scenario, when used for the first time, the user can use the user terminal device 130 (such as a mobile phone) to scan the access port link 113 (such as a two-dimensional code) on the washing machine panel to download the access port 131 (such as an APP), and then set the operation parameters of the washing machine on the APP.

After the networking is successful, i.e., after the user terminal device 130 successfully communicates with the cloud server 120, the operation parameters set by the user may be sent to the cloud server 120 through the APP, and then the control instruction including the operation parameters is sent by the cloud server 120 to the communication module 111 and the drive module 112 to realize control on the washing machine.

To facilitate user use, such as in a quick starting scenario, the user may manipulate the washing machine through the hard boot module 114.

Specifically, in response to the hard boot module 114 being pressed (i.e., the input signal being received), the drive module 112 can turn on the power to the washing machine (before this, the washing machine may be in a shutdown or sleep state except for the drive module 112). At the same time, a hard boot signal is sent to the cloud server 120 through the communication module 111 to indicate that the user has a demand for using the washing machine.

Further, after receiving and responding to the hard boot signal, the cloud server 120 may wait for a period of time. If the control request from the user terminal device 130 is not received within the preset time period after receiving the hard boot signal, the cloud server 120 may generate the control instruction according to a preset default program and send the control instruction to the communication module 111.

The default program may collect, by the cloud server 120, setting parameters of the washing machine set by the user historically.

Alternatively, if a control request from the user terminal device 130 is received within a preset time period after receiving the hard boot signal, the cloud server 120 may generate the control instruction according to the control request and send the control instruction to the communication module 111.

Further, after receiving and responding to the control instruction, the communication module 111 may send the control instruction to the drive module 112, and the drive module 112 sends a control signal corresponding to the control command code included in the control instruction to each functional module on the washing machine, so as to control each functional module of the washing machine to execute a corresponding laundry program.

Thus, by using the solution of this embodiment, the control instruction sent by the cloud server 120 is directly identifiable by the functional module of the home appliance 110 such that it is possible to remove hardware equipment related to the control module in the home appliance 110. On the one hand, the manufacturing cost of the home appliance 110 can be reduced, and on the other hand, all the control functions of the home appliance 110 can be controlled through the cloud (such as the cloud server 120), making the cloud become the control center of all the home appliances. Further, by removing the control module of the home appliance 110 from the home appliance 110, and virtualizing and integrating it into the cloud, the repeated control function can be effectively avoided, and the control advantage of the smart home appliance can be fully utilized to optimize the user experience. Thus, software implementing one or various control functions may be reused for many home appliances, which decreases the costs. Moreover, it may be easier to provide updates to the software and to maintain the software.

It should be noted that the solution of this embodiment can be applied to any existing home appliance with a control hardware unit, such as a refrigerator, a washing machine, an oven, an air conditioner, a microwave oven, and the like, and other home appliance integrated with the control module can realize the removal and virtualization design of the control module by using the design of this embodiment to realize the function control of the home appliance through the cloud. In this case, the cloud server 120 may be equivalent to the brain of all home appliances, and the control functions of all home appliances may be realized by the cloud server 120.

Figure 2:
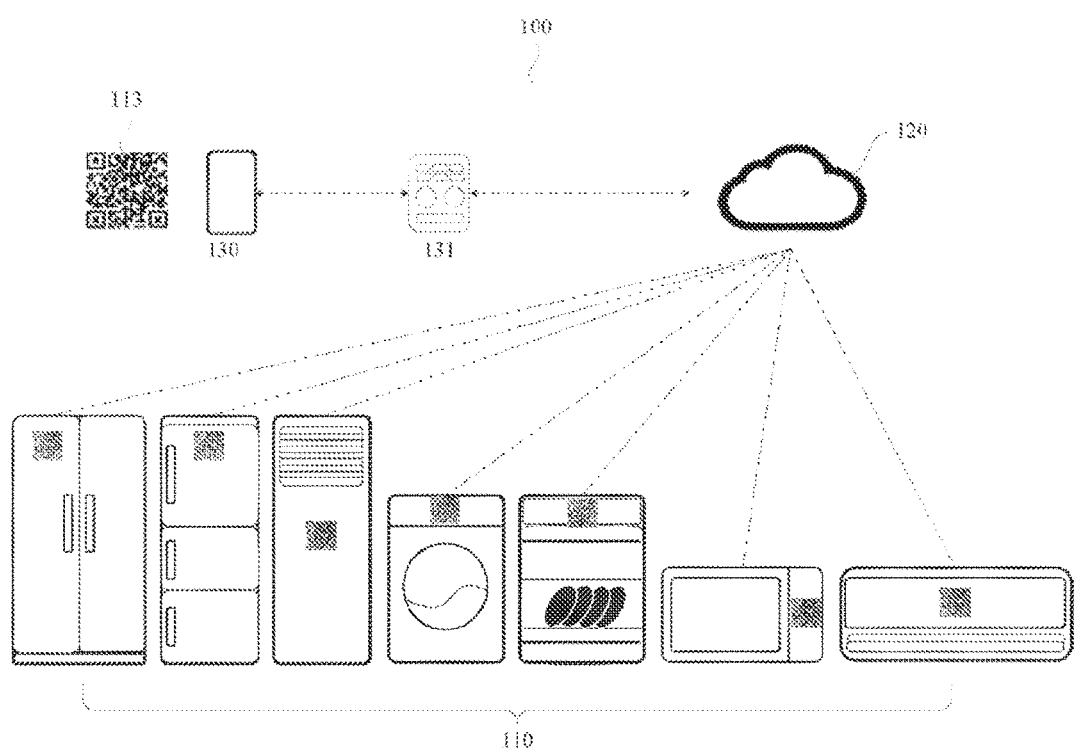
FIG. 2 is a schematic diagram of a typical application scenario of embodiments of the present invention.

In a typical application scenario, the home appliance control system 100 may include at least one home appliance 110, a cloud server 120 and a user terminal device 130. The at least one home appliance 110 may include the refrigerator, the air conditioner, the washing machine, the dishwasher, the microwave oven, and the air conditioner shown in FIG. 2.

The detailed description of each of the home appliances 110 may be provided with the related description in the embodiment shown in FIG. 1 above.

Each of the home appliances 110 communicates with the cloud server 120.

The APP of the user terminal device 130 may be associated with available operation modes and operation parameters of all the home appliances 110.

The cloud server 120 may set an associated preset database for each home appliance 110, so as to search for a corresponding preset database according to the home appliance 110 pointed by the control request when the control request including the operation mode from the user terminal device 130 is received, thereby determining the corresponding control request.

Thus, through the user terminal device 130 and the cloud server 120, the user can conveniently control the daily operation of all the home appliances 110.

Further, the design of the APP enables the user to operate and guide more intuitively and dynamically.

Further, since the control module is removed from the home appliance 110, the failure rate of the home appliance 110 can be significantly reduced, and the local control module is prevented from being damaged and failing to be repaired in time. Moreover, by using the solution of this embodiment, the control function can be directly upgraded/added in the cloud, so as to save manpower and material resources, facilitate after-sales maintenance and online processing of after-sales problems, and optimize the user experience.

Further, by using the solution of this embodiment, the collection of big data can be realized in the cloud, the daily operation data of all the home appliances 110 connected to the cloud server 120 can be obtained, and the functions and performance of the home appliances 110 can be continuously optimized through the analysis of big data, so that the user experience can also be optimized.

Although the present invention has been disclosed above, the present invention is not limited thereto. Any changes and modifications may be made by those skilled in the art without departing from the scope of the present invention. Therefore, the scope of the present invention should be determined by the scope defined by the claims.

What is claimed is:

1. A home appliance control system, comprising:
   a home appliance having at least one functional module;
   a cloud server communicating with said home appliance, said cloud server adapted to send a control instruction identifiable by said at least one functional module;
   a user terminal device sending a control request to said cloud server, and after receiving and responding to the control request of said user terminal device, said cloud server generating the control instruction according to the control request;
   said home appliance further having a communication module, said communication module adapted to receive the control instruction from said cloud server; and
   said home appliance further having a drive module and a hard boot module, said drive module adapted to acquire the control instruction from said communication module and drive said at least one functional module according to the control instruction, said hard boot module coupled to said communication module and said drive module, and after receiving and responding to an input signal, said hard boot module generating a hard boot signal, and sending the hard boot signal to said cloud server through said communication module, wherein after receiving and responding to the hard boot signal and failing to receive the control request of said user terminal device within a preset time period, said cloud server generating the control instruction.

2. The home appliance control system according to claim 1, wherein the control request has an operation mode of said home appliance, and said cloud server generates the control instruction according to the control request as follows:

said cloud server searches an operation parameter matching with the operation mode included in the control request in a preset database, and generates the control instruction based on the operation parameter, the preset database recording a corresponding relationship between the operation mode of said home appliance and the operation parameter.

3. The home appliance control system according to claim 1, wherein:

said user terminal device has an access port, said access port is connected to said cloud server, a user sends the control request to said cloud server through said access port; and said home appliance has an access port link, said user terminal device is connected to said access port through said access port link.

4. The home appliance control system according to claim 3, wherein said access port link is a graphic code.

5. The home appliance control system according to claim 1, wherein the control instruction is generated according to historical control data for said home appliance, the historical control data containing operation parameters of said at least one functional module.

6. The home appliance control system according to claim 1, wherein said home appliance contains only one button, wherein said one button is adapted to trigger said hard boot module.

7. The home appliance control system according to claim 1, wherein said communication module is integrated with said drive module.

8. The home appliance control system according to claim 1, wherein said communication module is a wireless communication module.

\* \* \* \* \*